UNITED STATES PATENT OFFICE.

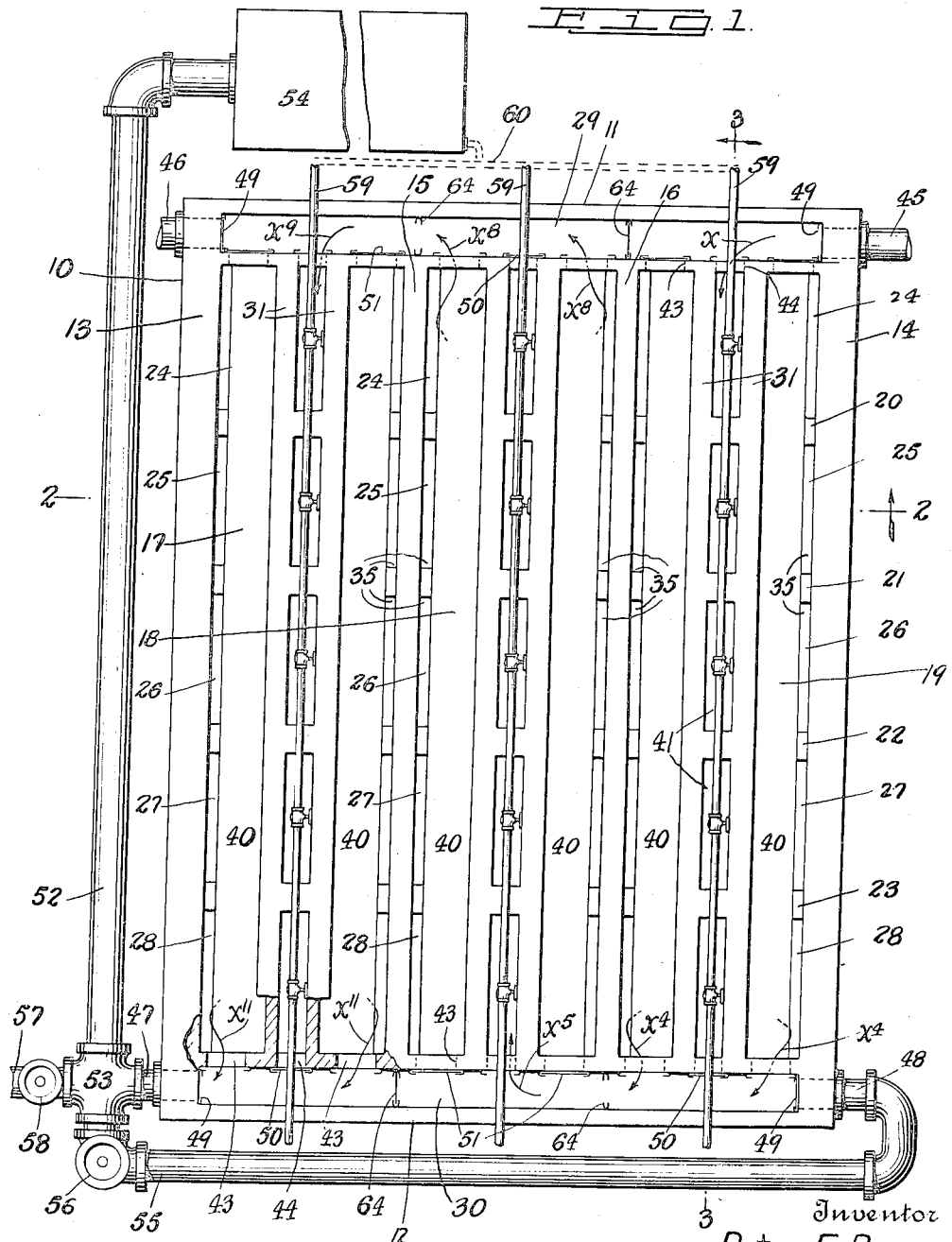

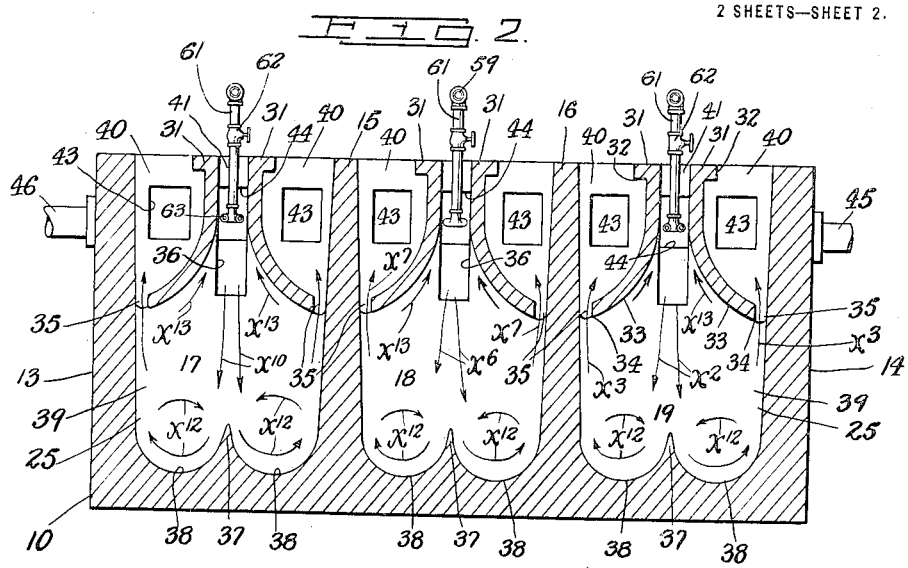

PETER FRANCIS BROWN, OF HUNTINGTON, NEW YORK.

METHOD OF AND APPARATUS FOR TREATING SEWAGE.

1,289,378.  Specification of Letters Patent.  Patented Dec. 31, 1918.

Application filed May 2, 1918. Serial No. 232,022.

*To all whom it may concern:*

Be it known that I, PETER F. BROWN, a citizen of the United States, and residing at Huntington, L. I., in the county of Suffolk and State of New York, have invented certain new and useful Improvements in Methods of and Apparatus for Treating Sewage, of which the following is a specification, such as will enable those skilled in the art to which it appertains to make and use the same.

This invention relates to sewage treating apparatus, and the object of the invention is to provide an improved method of treating sewage so as to more quickly settle the solids therein and thereby cause immediate bacterial action and to so handle the sewage as to entirely eliminate the discharge of bad odors therefrom, as well as to treat the sewage discharge into the apparatus employed in a manner that will purify the liquid discharged from said apparatus to the extent of ninety per cent. or more; and a further object of the invention is to provide an improved apparatus for carrying the method into effect; and a still further object is to provide means whereby the flow of the sewage may be reversed through the apparatus for the purpose of distributing the collection of the solids equally throughout the series of tanks employed in the apparatus.

The invention described and claimed herein is an improvement on what is known as the "Imhoff" sewage treating system, as described and claimed in U. S. Patent No. 924,664 granted to Karl Imhoff, June 15, 1909, and is fully disclosed in the following specification, of which the accompanying drawings form a part, in which the separate parts of my improvement are designated by suitable reference characters in each of the views, and in which:—

Figure 1 is a plan view of my improved apparatus with part of the construction broken away and with part shown in section;

Fig. 2 a partial section on the line 2—2 of Fig. 1;

Fig. 3 a partial section on the line 3—3 of Fig. 1; and,

Fig. 4 a perspective view of a trough which I employ.

In the practice of my invention, I employ a treatment tank 10 which is of rectangular form and preferably composed of concrete, and comprises end walls 11 and 12 and side walls 13 and 14, the end walls 11 and 12 being connected by intermediate walls 15 and 16 which divide the tank into three longitudinally arranged chambers 17, 18 and 19, each of which is divided transversely by walls 20, 21, 22 and 23 thus forming a plurality of compartments 24, 25, 26, 27 and 28, in each of the chambers 17, 18 and 19.

The top portion of the end walls 11 and 12 are recessed to form transverse ports or passages 29 and 30, as clearly shown in Figs. 1 and 3, and the compartments 24 to 28 inclusive are connected with each other and with the end walls 11 and 12 adjacent to the top portion thereof by longitudinal walls 31, the tops of which are flanged as shown at 32, and the bottom portions of which are curved outwardly as shown at 33, and terminate at predetermined distance from the side walls 13 and 14 and intermediate walls 15 and 16 as shown at 34 to form passage-ways 35. The walls 20 to 23 inclusive are cut out centrally thereof and adjacent to the top portions thereof as shown at 36, and these cut-out portions form a communication between the separate compartments 24 to 28 inclusive.

The bottom of the chambers 17, 18 and 19, or the separate compartments 24 to 28 inclusive therein, are each provided with a central upwardly directed beveled rib 37 forming oppositely arranged concavo-convex pits 38 as clearly shown in Fig. 2 of the drawing, and the walls 31 divide the compartments 24 to 28 inclusive into bottom storage chambers 39, upper and oppositely arranged chambers or passage-ways 40, and centrally and between the walls 31 are gas vents 41 common in apparatus of this class. The gas vents 41 extend the full length of the chambers 17, 18 and 19 and are only interrupted by the top portions 42 of the walls 20 to 23 inclusive.

The end walls 11 and 12 are provided with apertures 43 which communicate with the chambers or passage-ways 40, and the ports or passages 29 and 30 as clearly illustrated in Figs. 1 and 2 of the drawing. The gas vents 41 communicate with the ports or passages 29 and 30 through apertures 44 at the opposite ends thereof, as clearly indicated in Figs. 1, 2 and 3 of the drawing.

The port or passage 29 is provided at the opposite ends thereof with intake pipes 45 and 46 which pass through the side walls 13 and 14, as clearly shown in Fig. 1, and by means of which the sewage from any source is discharged into my improved apparatus, or the port or passage 29 at one end thereof, and the port or passage 30 at the other end of the apparatus are provided with exhaust or discharge pipes 47 and 48 which pass through the side walls 13 and 14 and the intake and exhaust ports are controlled by suitable gate devices 49, while the apertures 44 between the gas vents and the ports or passages 29 and 30 are controlled by gate constructions 50, while the communication 43 between the chambers or passage-ways 40 and the ports or passages 29 and 30 are controlled by gate constructions 51 as clearly shown in Fig. 1 of the drawing.

In Fig. 1 of the drawing I have shown a pipe 52 connected with a four-way coupling 53 with which the pipe 47 is connected, and the pipe 52 communicates with a storage tank 54, and a pipe 55 provided with a valve device 56 is connected with the pipe 48 and the coupling 53, and an outlet pipe 57 provided with a valve device 58 is also connected with the coupling 53. With this arrangement of pipes regardless of the flow of the sewage through my improved apparatus or tank 10, the liquid discharged therefrom may be either stored in the sewage tank, or discharged through the pipe 57 as hereinafter described.

Mounted over and longitudinally of each of the chambers 17, 18, and 19 are water pipes 59 which may receive their supply of water from the storage tank 54 as indicated in dotted lines at 60, or be supplied in any other desired manner, and connected with said pipes at spaced intervals or directly over the central portion of the separate compartments 24 to 28 inclusive are depending pipes 61 having valves 62, and connected with the lower end of said pipes are jet tubes 63, the open ends of which are directed with the flow or in the direction of the flow of sewage through said compartments as clearly indicated in Figs. 2 and 3 of the drawing. The jet tubes are so located and designed to be used to break up the solids in the sewage, if at any time the same should collect or tend to retard the flow at the top of the separate compartments, and said jet tubes may also be used to break up the solids and increase the velocity of the flow through the separate compartments in order to equalize the settlement of the solids in the various compartments.

From the foregoing description the operation of my improved apparatus will be readily understood when taken in connection with the accompanying drawing and the following statement thereof. Presuming that the sewage is admitted through the intake pipe 45, the same will pass into the gas vent 41 through the aperture 44 as indicated by the arrow $x$, the apertures 43 entering into the compartment 24 of the chamber 19 being closed by the gate construction 51 and said sewage passes through said vent and over the separate compartments 24, 25, 26, 27 and 28 as well as downwardly into each of the said compartments as indicated by the arrows $x^2$ in Fig. 2, and said sewage passes upwardly through the passage-ways 35 as indicated by the arrows $x^3$ of Fig. 2 and outwardly through the apertures 43 communicating with the port or passage 30 at the opposite end of the tank as indicated by the arrows $x^4$ in Fig. 1 of the drawing. The sewage then passes through said port or passage and into the gas vent 41 in the chamber 18 as indicated by the arrow $x^5$ over the separate compartments 28, 27, 26, 25 and 24 in said chamber, and downwardly into said compartments as indicated by the arrows $x^6$ in Fig 2, upwardly through the passage-ways 35 as indicated by the arrows $x^7$ in Fig. 2, and outwardly through the apertures 43 communicating with the port or passage 29 at the end of the tank as indicated by the arrows $x^8$, through said port or passage, into the gas vent 41 in the chamber 17 as indicated by the arrow $x^9$ over the compartments 24 to 28 inclusive, and downwardly thereinto in the direction of the arrows $x^{10}$ and out through the apertures 43 into the port or passage 30 as indicated by the arrows $x^{11}$ and is discharged from said port or passage through the pipe 47 from which it may pass through the pipe 52 to the storage tank 54, or may pass out through the pipe 57 as desired.

In the foregoing operation the various apertures 43 and 44 communicating with the ports or passages 29 and 30 are open or closed by the gate constructions 50 and 51, as indicated in Fig. 1, and the ports or passages 29 and 30 are partitioned off by gate constructions 64 also indicated in said figure, and the gate constructions 49 to the pipes 46 and 48 are closed, but in reversing the flow of sewage through the tank or treating apparatus by admitting the sewage through the pipe 46 and discharging it through the pipe 48, all of said gate constructions that are closed as shown in Fig. 1 will be opened and the open gate constructions closed.

If at any time the collection of the solids in the first two or three compartments 24, 25 and 26 becomes too great I may introduce trough devices 65 such as shown in Fig. 4, one of which is indicated in dotted lines in Fig. 3, said devices comprising a channel body 66, the top of which is provided with oppositely directed flanges 67, which are adapted to rest on the top of the walls 31 and the channel body opens upwardly or is closed at the bottom as shown at 68, and the bottom 68 is extended at the opposite ends thereof as shown at 69, one of these extensions being adapted to rest in the bottom of the port or passage 29 as indicated in Fig. 3. It will be understood that any desired number of these may be employed for the purpose of discharging the sewage into either of the compartments 24, 25, 26 or 27 or shutting off the discharge into such compartments.

With my improved method of introducing the sewage into and through a series of chambers, each of which is divided transversely into a plurality of compartments, and passing said sewage downwardly through each of said compartments in said chambers as above described and indicated by the arrows $x$ to $x^{11}$ inclusive, in which action or method of handling the sewage, the solids are caused to drop into the bottom of the separate compartments, as the sewage passes thereover, by reason of the downward flow through said compartments, as indicated by the arrows $x^2$, $x^6$ and $x^{10}$ in Fig. 2, the settling of the solids takes place immediately, and by reason of the construction of the bottoms of the separate compartments as indicated in Fig. 2 of the drawing, the flow has a tendency to constantly keep the solids collected at the bottom thereof in action, or turns the same as indicated by the arrows $x^{12}$ in Fig. 2, thus releasing the gases therefrom and preventing the collection or pocketing of such gases. With the construction of the walls 31 as shown at 33 the gas escaping from the solids may freely pass upwardly around said portions 33 and be discharged through the gas vents 41 as indicated by the arrows $x^{13}$, while the water and light or broken up solids in the sewage passes into the chambers or passage-ways 40 as indicated by the arrows $x^3$ and $x^7$ in Fig. 2, and this operation continues until the sewage is passed through all of the compartments in the chambers 19, 18 and 17, and when the same is discharged through the pipe 47, all of the solids, including the light or broken up matter will have been separated from the liquid of the sewage and by reason of the treatment of such solids, such discharged liquid when tested has been found to be ninety per cent. or more pure.

As above stated with my improved method, the solids settle in the various compartments immediately upon the entrance thereinto, or thereover, and the bacterial action takes place immediately and it is by reason of this fact that the liquids discharged from the tank or apparatus through the pipe 47, as above set out, tests ninety per cent. pure. Further by reason of the action of the flow of sewage downwardly into and through the various compartments and as indicated by the arrows $x^2$ in Fig. 2, or by constantly keeping the solids collected in the compartments in action the gases are discharged therefrom in minute form and most of such gases are taken up by the water, and in this way the odor arising from tanks or apparatus of this class under consideration is eliminated.

After the solids have collected to a great extent in the various compartments the same may be removed in the usual manner and discharged into a settling or storage tank where it may be sterilized in the usual manner, but the apparatus for accomplishing this result is old and wellknown and for this reason has not been shown nor described in this application.

While I have shown a tank or apparatus divided longitudinally into three chambers, each of which is sub-divided transversely into five compartments, it will be understood that my invention is not limited to this arrangement of chambers and compartments nor to the number of the same, and various changes in and modifications of the details of construction herein shown and described may be made, within the scope of the appended claims, without departing from the spirit of my invention, or sacrificing its advantages.

Having fully described my invention, what I claim as new and desire to secure by Letters Patent, is:—

1. The process of treating sewage to purify it which consists in passing the same through a plurality of treatment compartments, introducing the flow of said sewage into the top central portion of one of the end compartments, the flow of said sewage being directed downwardly into the central bottom portion of each of said compartments to cause the quick settling of the solids, dividing the downward flow of sewage to give action to the collected solids and to break up the same and discharge the gases therefrom in minute form, directing the discharge of the sewage from said compartments upwardly at the opposite sides of each of the compartments and discharging said sewage at the opposite sides of the other end compartment.

2. The process of treating sewage to purify it which consists in passing the same through a plurality of chambers each of which is divided into a plurality of treatment compartments, introducing the flow of sewage into the central top portion of a treatment compartment at one end of each of said chambers, the flow of sewage being directed downwardly into the central bottom portion of each of the compartments in said chambers to cause the quick settling of the solids, dividing the downward flow of sewage into each of said compartments to give action to the collected solids therein to break up the same and discharge the gases therefrom in minute form, directing the discharge of the sewage from said compartments upwardly at the opposite sides of each of said compartments and discharging the same from the opposite sides of the compartment at the other end of each of said chambers.

3. In an apparatus of the class described, a tank having an elongated chamber divided transversely into a plurality of treatment compartments each of which is divided into a bottom storage chamber, central gas vents and top chambers or passageways, means for placing the gas vents in all of said compartments in communication, means for placing the storage chambers in communication with the top chambers or passageways, means for introducing the sewage through the gas vents in one of the end compartments, and means for discharging said sewage through the chambers or passageways of the other end compartment.

4. In an apparatus of the class described, a tank having an elongated chamber divided transversely into a plurality of treatment compartments, each of which is divided into a bottom storage chamber, central gas vents and top chambers or passageways, means for placing the gas vents in all of said compartments in communication, means for placing the storage chambers in communication with the top chambers or passageways, means for introducing the sewage through the gas vent in one of the end compartments, means for discharging said sewage through the chambers or passageways of the other end compartment, the flow of the sewage into and over each of said compartments being directed downwardly, and means for dividing said downward flow in each compartment.

5. In an apparatus of the class described, a tank, having an elongated chamber divided transversely into a plurality of treatment compartments, each of which is divided into a bottom storage chamber, central gas vents and top chambers or passageways, means for placing the gas vents in all of said compartments in communication, means for placing the storage chamber in communication with the top chambers or passageways, means for introducing the sewage through the gas vent in one of the end compartments, means for discharging said sewage through the chambers or passageways of the other end compartment, the flow of the sewage into and over each of said compartments being directed downwardly, means for dividing said downward flow in each compartment, and means for breaking up the solids in the top portion of the gas vent in each compartment.

6. In an apparatus of the class described, a tank having an elongated chamber divided transversely into a plurality of treatment compartments, each of which is divided into a bottom storage chamber, central gas vents and top chambers or passageways, means for placing the gas vents in all of said compartments in communication, means for placing the storage chamber in communication with the top chambers or passageways, means for introducing the sewage through the gas vent in one of the end compartments, means for discharging said sewage through the chambers or passageways of the other end compartment, the flow of the sewage into and over each of said compartments being directed downwardly, means for dividing said downward flow in each compartment, and means for passing the flow of sewage over one of the end compartments.

7. In an apparatus of the class described, a tank divided longitudinally into a plurality of chambers, each of said chambers being divided transversely into a plurality of compartments, the end walls of said tank being provided with ports or passages, each of the compartments in said chambers being divided into a bottom storage chamber at the top of which is a central gas vent and two top chambers or passage-ways, means for placing the storage chambers and chambers or passage-ways in each compartment in communication, means for placing the gas vent of each compartment in communication, means for introducing the flow of sewage into the port or passage at one end of the tank, means for passing said sewage into a compartment at one end of one of said chambers, and means for discharging said sewage from the chambers or passage-ways in the compartment at the other end of said chamber into the port or passage at the opposite end of said tank.

8. In an apparatus of the class described, a tank divided longitudinally into a plurality of chambers, each of said chambers being divided transversely into a plurality of compartments, the end walls of said tank being provided with ports or passages, each of the compartments in said chambers being divided into a bottom storage chamber at the top of which is a central gas vent and two top chambers or passage-ways, means for placing the storage chambers and chambers or passage-ways in each compartment in communication, means for placing the gas vent of each compartment in communication, means for introducing the flow of sewage into the port or passage at one end of the tank, means for passing said sewage into a compartment at one end of one of said chambers, means for discharging said sewage from the chambers or passage-ways in the compartment at the other end of said chamber into the port or passage at the opposite end of said tank, means for passing said sewage through said last named port or passage into the gas vent in a compartment at one end of another of said chambers, and means for discharging said sewage from the chambers or passage-ways in the compartment at the other end of said last named chamber into the first named port or passage.

9. In an apparatus of the class described, a tank divided longitudinally into a plurality of chambers, each of said chambers being divided transversely into a plurality of compartments, the end walls of said tank being provided with ports or passages, each of the compartments in said chambers being divided into a bottom storage chamber at the top of which is a central gas vent and two top chambers or passage-ways, means for placing the storage chambers and chambers or passage-ways in each compartment in communication, means for placing the gas vents of the compartments in communication, means for introducing the flow of sewage into the port or passage at one end of the tank, means for passing said sewage into a compartment at one end of one of said chambers, means for discharging said sewage from the chambers or passage-ways in the compartment at the other end of said chamber into the port or passage at the opposite end of said tank, means for passing said sewage through said last named port or passage into the gas vent in a compartment at one end of another of said chambers, means for discharging said sewage from the chambers or passage-ways in the compartment at the other end of said last named chamber into the first named port or passage, means for passing the sewage from the first-named port or passage into the gas vent of a compartment at one end of a third chamber, means for discharging it through the chambers or passage-ways in a compartment at the end of said last named chamber into the second named port or passage, and means for discharging the sewage from said port or passage.

10. In an apparatus of the class described, a tank divided longitudinally into a plurality of chambers, each of said chambers being divided transversely into a plurality of compartments, the end walls of said tank being provided with ports or passages, each of the compartments in said chambers being provided with a bottom storage chamber, a top central gas vent, and two top chambers or passage-ways, means for placing the storage chambers and chambers or passage-ways in each compartment in communication, means for placing the gas vent of each compartment in communication, means for introducing the flow of sewage into the port or passage at one end of the tank, means for passing said sewage into a compartment at one end of one of said chambers, and means for discharging said sewage from the chambers or passage-ways in the compartment at the other end of said chambers into the port or passage at the opposite end of said tank, and means for breaking up the solids in the sewage at the top portion of each of the compartments.

11. In an apparatus of the class described, a tank divided longitudinally into a plurality of chambers, each of said chambers being divided transversely into a plurality of compartments, one end wall of said tank being provided with an intake port or passage and the other end wall with a discharge port or passage, pipes communicating with both of said ports or passages each of the compartments in said chambers being provided with a bottom storage chamber, a top central gas vent, and two top chambers or passage-ways, means for forming a communication between the storage chamber and said chambers or passage-ways, apertures formed in the partition walls of said compartments for placing the gas vents in communication, means for introducing the sewage from the intake port or passage at one end of the tank into the gas vent of the compartment at the corresponding end of one of said chambers, and means for discharging said sewage from the chambers or passage-ways in the compartment at the other end of said chambers into the discharge port or passage at the opposite end of the tank.

12. In an apparatus of the class described, a tank divided longitudinally into a plurality of chambers, each of said chambers being divided transversely into a plurality of compartments, one end wall of said tank being provided with an intake port or passage and the other end wall with a discharge port or passage, pipes communicating with both of said ports or passages, each of the compartments in said chambers being divided into a bottom storage chamber at the top of which is a central gas vent and two top chambers or passage-ways, means for forming a communication between the storage chamber and said chambers or passage-ways, apertures formed in the partition walls of said compartments for placing the gas vents in communication, apertures for placing the gas vents in the end compartment of each chamber in communication with the intake and discharge ports or passages and other apertures for placing the chambers or passage-ways in the end compartments of said chamber in communication with the intake and discharge ports or passages.

13. In an apparatus of the class described, a tank divided longitudinally into a plurality of chambers, each of said chambers being divided transversely into a plurality of compartments, one end wall of said tank being provided with an intake port or passage and the other end wall with a discharge port or passage, pipes communicating with both of said ports or passages, each of the compartments in said chambers being divided into a bottom storage chamber at the top of which is a central gas vent and two top chambers or passage-ways, means for forming a communication between the storage chamber and said chambers or passage-ways, apertures formed in the partition walls of said compartments for placing the gas vents in communication, apertures for placing the gas vents in the end compartment of each chamber in communication with the intake and discharge ports or passages and other apertures for placing the chambers or passage-ways in the end compartments of said chamber in communication with the intake and discharge ports or passages, and gate devices for controlling the flow of sewage through all of said apertures.

14. In an apparatus of the class described, a tank divided longitudinally into a plurality of chambers, each of said chambers being divided transversely into a plurality of compartments, one end wall of said tank being provided with an intake port or passage and the other end wall with a discharge port or passage, pipes communicating with both of said ports or passages, each of the compartments in said chambers being divided into a bottom storage chamber at the top of which is a central gas vent and two top chambers or passage-ways, means for forming a communication between the storage chamber and said chambers or passage-ways, apertures formed in the partition walls of said compartments for placing the gas vents in communication, apertures for placing the gas vents in the end compartment of each chamber in communication with the intake and discharge ports or passages and other apertures for placing the chambers or passage-ways in the end compartments of said chamber in communication with the intake and discharge ports or passages, gate devices for controlling the flow of sewage through all of said apertures, and gate devices for sub-dividing the intake and discharge ports or passages.

In testimony that I claim the foregoing as my invention I have signed my name in presence of the subscribing witnesses this 29th day of April, 1918.

PETER FRANCIS BROWN.

Witnesses:
R. W. Downs,
Douglass Conklin.